(12) United States Patent
Sanae

(10) Patent No.: US 10,471,776 B2
(45) Date of Patent: Nov. 12, 2019

(54) PNEUMATIC TIRE

(71) Applicant: Sumitomo Rubber Industries, Ltd., Kobe-shi, Hyogo (JP)

(72) Inventor: Ryuhei Sanae, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 282 days.

(21) Appl. No.: 15/151,871

(22) Filed: May 11, 2016

(65) Prior Publication Data

US 2016/0332489 A1 Nov. 17, 2016

(30) Foreign Application Priority Data

May 12, 2015 (JP) .................................. 2015-097455

(51) Int. Cl.
*B60C 11/03* (2006.01)
*B60C 11/13* (2006.01)

(52) U.S. Cl.
CPC ...... *B60C 11/0304* (2013.01); *B60C 11/0302* (2013.01); *B60C 11/0306* (2013.01); *B60C 11/0332* (2013.01); *B60C 11/1353* (2013.01); *B60C 11/032* (2013.01); *B60C 2011/0334* (2013.01); *B60C 2011/0341* (2013.01); *B60C 2011/0365* (2013.01); *B60C 2011/0369* (2013.01); *B60C 2011/0372* (2013.01)

(58) Field of Classification Search
CPC . B60C 11/03; B60C 11/0302; B60C 11/0304; B60C 11/0306; B60C 11/032; B60C 11/0332; B60C 11/1353; B60C 11/1369; B60C 2011/0334; B60C 2011/0341; B60C 2011/0365; B60C 2011/0367; B60C 2011/0369; B60C 2011/0372; B60C 2011/0381
USPC ........................................ 152/209.18, 209.22
See application file for complete search history.

(56) References Cited

U.S. PATENT DOCUMENTS

| | | | | |
|---|---|---|---|---|
| 5,814,169 | A * | 9/1998 | Yamaguchi | B60C 11/11 152/209.2 |
| 2005/0183807 | A1 | 8/2005 | Hildebrand | |
| 2009/0229721 | A1* | 9/2009 | Ikeda | B60C 11/0306 152/209.18 |
| 2010/0186861 | A1* | 7/2010 | Ishiguro | B60C 11/0306 152/209.25 |

(Continued)

FOREIGN PATENT DOCUMENTS

EP 2 907 677 A2 8/2015
JP 2013-177114 A 9/2013
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A pneumatic tire includes a tread portion provided with main grooves extending continuously in the tire circumferential direction, the main grooves include an outboard shoulder main groove and an outboard crown main groove between which an outboard middle land region is defined. The outboard middle land region is provided with outboard middle transverse grooves having a shallow groove section and a deep groove section. The outboard middle transverse grooves include first and second outboard middle transverse grooves that are arranged alternately in the tire circumferential direction.

13 Claims, 9 Drawing Sheets

(56) References Cited

U.S. PATENT DOCUMENTS

| | | | |
|---|---|---|---|
| 2012/0160385 A1* | 6/2012 | Tanaka | B60C 11/0306 152/209.22 |
| 2012/0318419 A1* | 12/2012 | Iwabuchi | B60C 11/0304 152/209.8 |
| 2013/0199684 A1 | 8/2013 | Sakamoto | |
| 2015/0020937 A1* | 1/2015 | Nakamura | B60C 11/042 152/209.8 |
| 2016/0193886 A1 | 7/2016 | Iwasaki | |

FOREIGN PATENT DOCUMENTS

| | | | | |
|---|---|---|---|---|
| WO | WO-2013099820 A1 * | 7/2013 | | B60C 11/042 |
| WO | WO 2015/037464 A1 | 3/2015 | | |

* cited by examiner

PNEUMATIC TIRE

BACKGROUND OF THE INVENTION

The present invention relates to a pneumatic tire, more particularly to a tread pattern capable of improving steering stability on dry roads while maintaining wet performance.

In Japanese Patent Application Publication No. 2013-177114, a pneumatic tire is disclosed, wherein the tread portion is provided in an outboard middle land region with transverse grooves having a shallow groove section and a deep groove section. All of the shallow groove sections of the transverse grooves are disposed on the tire equator side, and accordingly, all of the deep groove sections are disposed on the outboard tread edge side. Such arrangement of the shallow groove sections and deep groove sections has a tendency that the rigidity of the outboard middle land region is excessively decreased on the outboard tread edge side. Therefore, the pneumatic tire disclosed in the above-mentioned patent document has a room for improvement in the steering stability on dry roads.

SUMMARY OF THE INVENTION

It is therefore, an object of the present invention to provide a pneumatic tire in which the steering stability on dry roads can be improved without sacrificing the wet performance.

According to the present invention, a pneumatic tire comprises:

a tread portion having an outboard tread edge to be positioned away from the center of a vehicle body and an inboard tread edge to be positioned close to the center of the vehicle body, and provided with main grooves extending continuously in the tire circumferential direction, the main grooves including an outboard shoulder main groove and an outboard crown main groove between which an outboard middle land region is defined, the outboard middle land region provided with outboard middle transverse grooves each comprising a shallow groove section and a deep groove section, the outboard middle transverse grooves including first outboard middle transverse grooves wherein their deep groove sections are is disposed on the outboard shoulder main groove side and their shallow groove sections are disposed on the outboard crown main groove side, and second outboard middle transverse grooves wherein their deep groove sections are disposed on the outboard crown main groove side and their shallow groove sections are disposed on the outboard shoulder main groove side, and the first outboard middle transverse grooves and the second outboard middle transverse grooves arranged alternately in the tire circumferential direction.

The pneumatic tire according to the present invention is provided with a tread pattern of left-right asymmetry (asymmetry about the tire equator). Accordingly, the mounting position of the tire in relation to a vehicle (which side is inside and which side is outside) is specified. Thus, the tread portion has an outboard tread edge to be positioned away from the center of the vehicle body and an inboard tread edge to be positioned close to the center of the vehicle body. For example, the sidewall portion to be located on outside when installed on the vehicle is provided with an indication such as "outside", and the sidewall portion to be located on inside is provided with an indication such as "inside".

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the adjacent tread edge in order to refer relative positions in the tire axial direction.

The tread edges are the axial outermost edges of the ground contacting patch which occurs under the normally inflated loaded condition when the camber angle of the tire is zero.

The tread width TW is the width measured under the normally inflated unloaded condition, as the axial distance between the tread edges determined as above.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The pneumatic tire according to the present invention may have the following features (1)-(7):

(1) each of the outboard middle transverse grooves has one end connected to the outboard shoulder main groove and the other end connected to the outboard crown main groove;

(2) the deep groove section and the shallow groove section of each of the outboard middle transverse grooves are connected to each other in an axial center part of the outboard middle land region;

(3) the deep groove section has a groove width more than that of the shallow groove section;

(4) the shallow groove section has a part having a constant depth, and the deep groove section has a part whose depth is gradually decreases toward the shallow groove section;

(5) the tread portion has an outboard shoulder land region which is defined on the axially outside of the outboard shoulder main groove and provided with outboard shoulder transverse grooves extending axially inwardly from the outboard tread edge, the outboard shoulder transverse grooves include first outboard shoulder transverse grooves whose axially inner ends are connected to the outboard shoulder main groove, the first outboard shoulder transverse grooves are aligned with the deep groove sections of the first outboard middle transverse grooves so as to be smoothly continuous therewith through the outboard shoulder main groove;

(6) the outboard shoulder transverse grooves include second outboard shoulder transverse grooves terminating within the outboard shoulder land region, and each of the second outboard shoulder transverse grooves is arranged between the circumferentially adjacent first outboard shoulder transverse grooves;

(7) the second outboard shoulder transverse grooves are aligned with the second outboard middle transverse groove so that the axially inner ends of the second outboard shoulder transverse grooves are substantially positioned at axially outward extensions of the second outboard middle transverse grooves.

DESCRIPTION OF THE PREFERRED EMBODIMENTS

Figure 1:
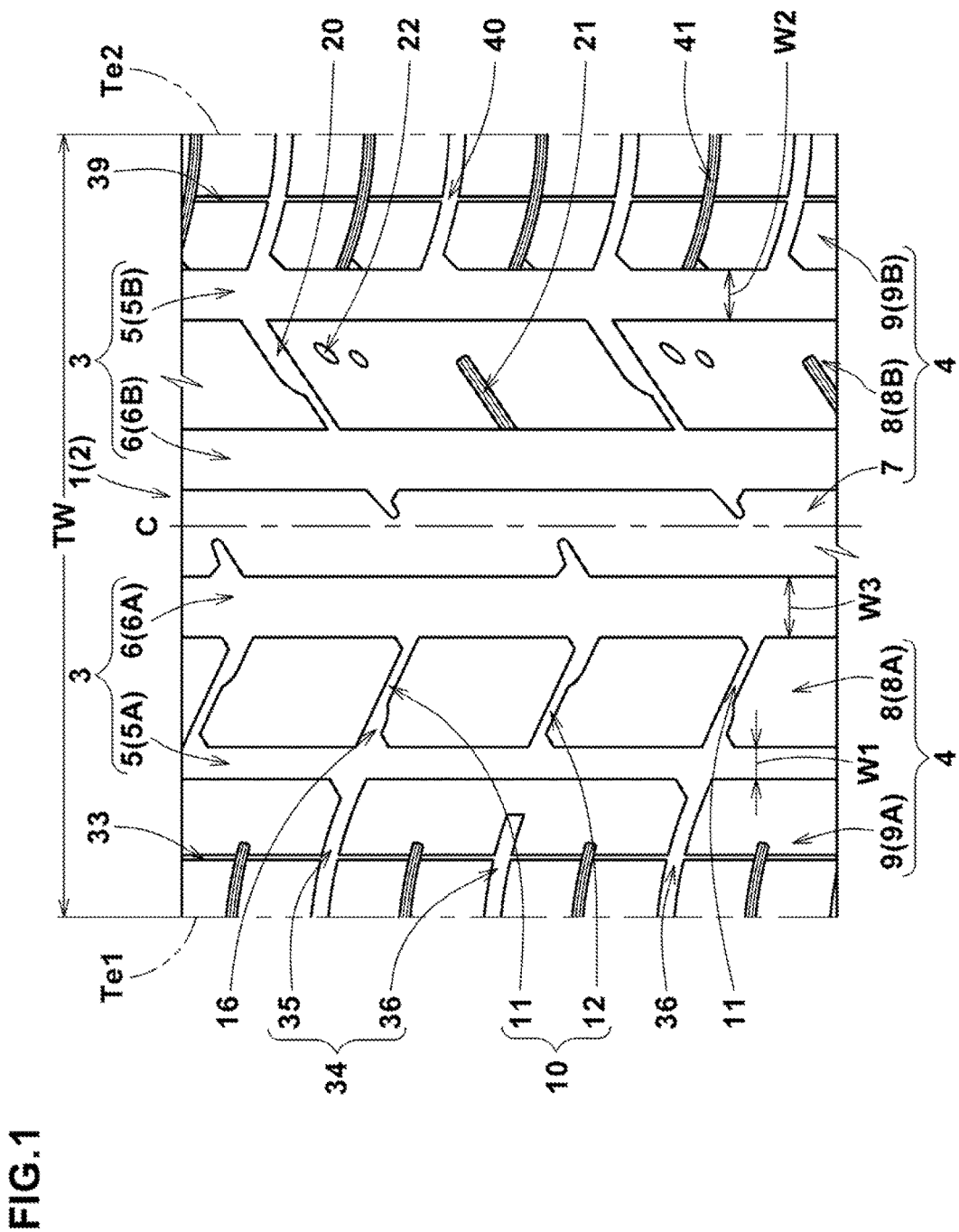
FIG. 1 is a developed partial view of the tread portion of a pneumatic tire as an embodiment of the present invention.

The present invention can be applied to a pneumatic tire, and suitably applied to a passenger car tire.

Taking a passenger car tire as an example, an embodiment of the present invention will now be described in detail in conjunction with the accompanying drawings.

In the drawings, a pneumatic tire 1 as an embodiment of the present invention comprises a tread portion, a pair of axially spaced bead portions, a pair of sidewall portions extending between the tread edges and the bead portions, a carcass extending between the bead portions, a tread reinforcing belt disposed radially outside the carcass in the tread portion as usual.

In FIG. 1, the left side is outside and the right side is inside.

The tread portion 2 is provided with main grooves 3 extending continuously in the tire circumferential direction to axially divide the tread portion 2 into land regions 4.

In this embodiment, the main grooves 3 are straight grooves.

However, the main groove 3 may be a zigzag or wavy groove.

The main grooves 3 include
a pair of axially outermost shoulder main grooves 5 which are an outboard shoulder main groove 5A and an inboard shoulder main groove 5B, and
at least one crown main groove 6 between the shoulder main grooves 5.

In this example, at least one crown main groove 6 is two crown main grooves 6 which are an outboard crown main groove 6A on the outboard tread edge side of the tire equator C, and an inboard crown main groove 6B on the inboard tread edge side of the tire equator C.

In this embodiment, the groove width of each main groove 3 is preferably set in a range of about 3.0% to 8.0% of the tread width TW, and the groove depth of each main groove 3 is preferably set in a range of from 5.0 to 12.0 mm in order to provide good drainage performance.

The groove width W1 of the outboard shoulder main groove 5A and the groove width W2 of the inboard shoulder main groove 5B are preferably less than the groove width W3 of the crown main groove 6 in order to increase the land ratio in tread edge side portions and thereby to improve the steering stability during cornering.

Preferably, the groove width W1 of the outboard shoulder main groove 5A is less than the groove width W2 of the inboard shoulder main groove 5B, therefore, the rubber volume of the tread portion 2 is increased on the outboard tread edge side, and thereby it is possible for the driver to feel a linear steering response even if a sharp turn is made.

The total of the groove widths of all the main grooves 3 disposed in the tread portion 2 is preferably 24% to 32%, more preferably 26% to 30% of the tread width TW. Thereby, the wet performance and the steering stability on dry roads can be improved with a good balance.

By the main grooves 3, the tread portion 2 is divided into the land region 4 which are a center land region 7, a pair of middle land region 8 (an outboard middle land region 8A and an inboard middle land region 8B), and a pair of shoulder land region 9 (an outboard shoulder land region 9A and an inboard shoulder land region 98).

Figure 2:
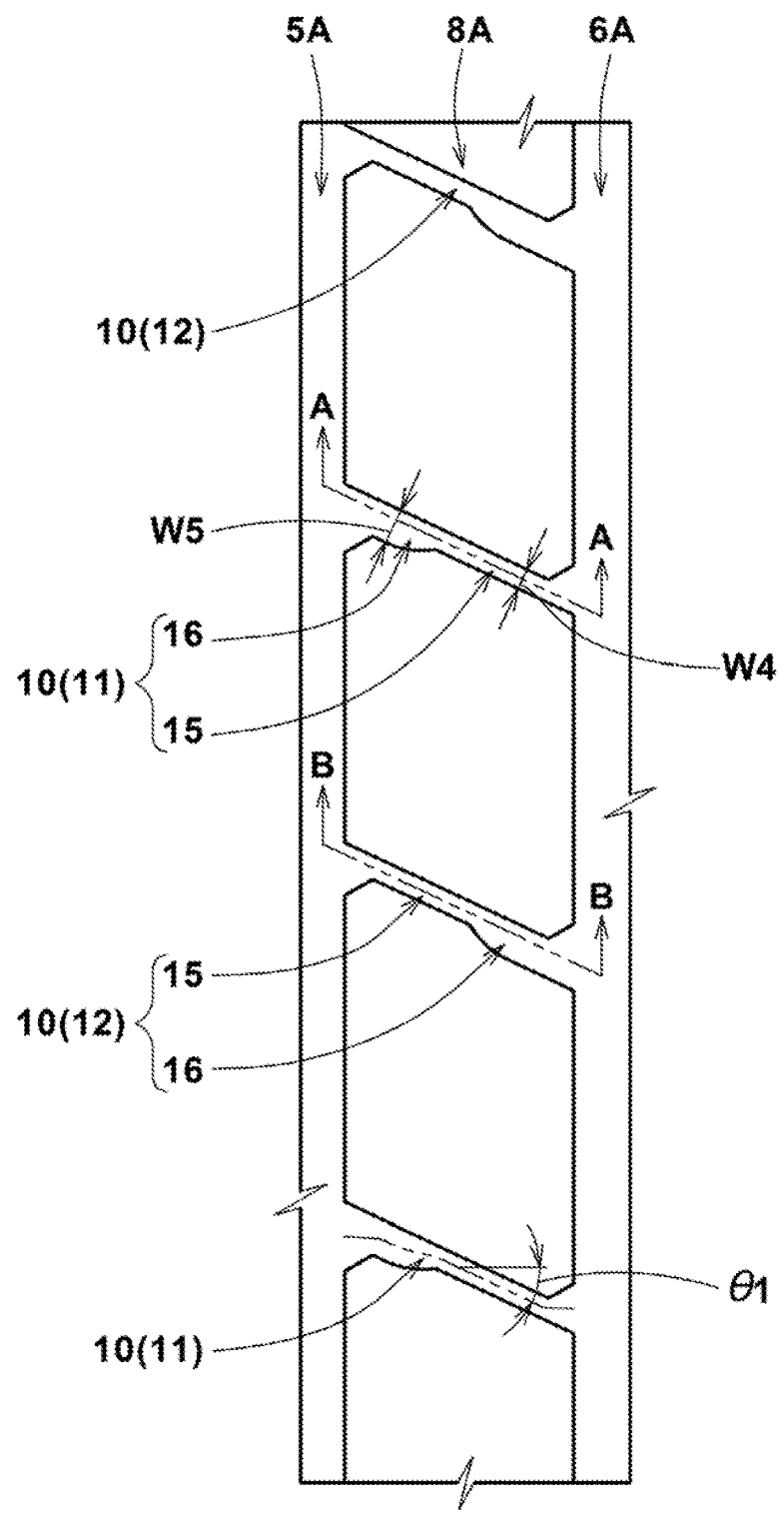
FIG. 2 is a partial top view of the outboard middle land region thereof.

As shown in FIG. 2, the outboard middle land region 8A, which is defined between the outboard shoulder main groove 5A and the outboard crown main groove 6A, is provided with outboard middle transverse grooves 10 extending from the groove 5A to the groove 6A.

The outboard middle transverse grooves 10 are inclined at an angle θ1 of from 20 to 35 degrees with respect to the tire axial direction so as to exert friction in the tire circumferential direction and tire axial direction by their edges.

Figure 3A:
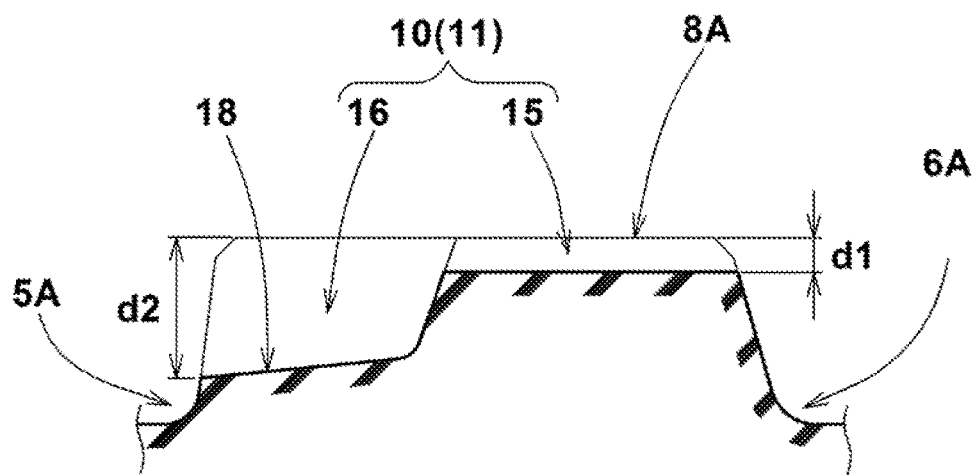
FIG. 3(a) is a cross sectional view taken along line A-A in FIG. 2 showing the depth of a first outboard middle transverse groove.

As shown in FIG. 3(a), the outboard middle transverse groove 10 has a shallow groove section 15 and a deep groove section 16 whose depth is more than that in the shallow groove section. Such outboard middle transverse groove 10 is helpful to improve the wet performance while maintaining the rigidity of the outboard middle land region 8A.

The outboard middle transverse grooves 10 include first outboard middle transverse grooves 11 and second outboard middle transverse grooves 12 as shown in FIG. 2.

As shown in FIG. 3(a), in the first outboard middle transverse groove 11, the deep groove section 16 is disposed on the outboard shoulder main groove 5A side, and the shallow groove section 15 is disposed on the outboard crown main groove 6A side.

Figure 3B:
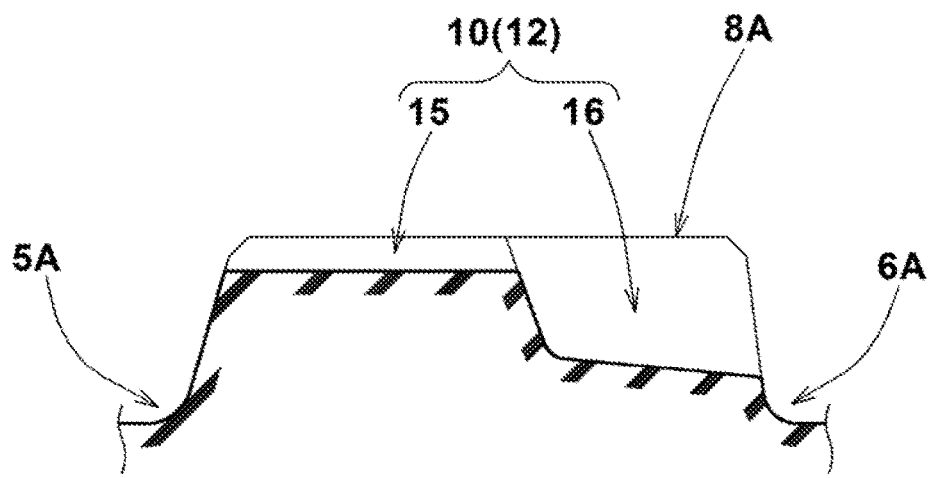
FIG. 3(b) is a cross sectional view taken along line B-BA in FIG. 2 showing the depth of a second outboard middle transverse groove.

As shown in FIG. 3(b), in the second outboard middle transverse groove 12, the deep groove section 16 is disposed on the outboard crown main groove 6A side, and the shallow groove section 15 is disposed on the outboard shoulder main groove 5A side.

The first outboard middle transverse grooves 11 and the second outboard middle transverse grooves 12 are arranged alternately in the tire circumferential direction.

In the outboard middle land region 8A provided with such alternate outboard middle transverse grooves 11 and 12, the rigidity is relatively increased on the outboard tread edge Te1 side by the second outboard middle transverse grooves 12 to thereby improve the steering stability on the dry roads. The outboard middle land region 8A is improved in the drainage on the tire equator side by the first outboard middle transverse grooves 11 to thereby improve the wet performance.

The shallow groove section 15 and the deep groove section 16 of the first outboard middle transverse groove 11 and those of the second outboard middle transverse groove 12 are described hereunder. The following descriptions of the shallow groove section 15 and the deep groove section 16 are applied to both of the first outboard middle transverse groove 11 and the second outboard middle transverse groove 12.

It is preferable that the shallow groove section 15 and the deep groove section 16 are connected to each other in a center region in the tire axial direction of the outboard middle land region 8A. Thereby, the wet performance and the steering stability on dry roads can be improved with a good balance.

Here, the central portion region means a region ranging about 15% of the width of the outboard middle land region 8A, toward both sides (tire equator side and tread edge side) from the center in the width direction of the outboard middle land region 8A.

Preferably, the groove width W5 of the deep groove section 16 is set in a range of from 1.3 to 2.0 times the groove width W4 of the shallow groove section 15 so that the deep groove section 16 contributes to good wet performance.

The ratio d1/d2 of the depth d1 of the shallow groove section 15 to the depth d2 of the deep groove section 16 is preferably not less than 0.15, more preferably not less than 0.20, but preferably not more than 0.35, more preferably not more than 0.30. Such shallow groove section 15 and deep groove section 16 can provide good drainage while maintaining the rigidity of the outboard middle land region 8A.

Preferably, the shallow groove section 15 has a part having a constant depth.

More preferably and in this embodiment, the shallow groove section 15 has a constant depth along the entire length thereof. Such shallow groove section 15 helps to prevent uneven wear of the outboard middle land region 8A while exerting the above-mentioned advantageous effect.

The maximum depth d2 of the deep groove section 16 is preferably set in a range of from 4.5 to 7.5 mm for example.

More preferably, the deep groove section 16 includes a gradually decreasing part 18 whose depth is gradually decreased toward the shallow groove section 15. Thereby, from the outboard middle land region 8A, a part where the rigidity is suddenly changed is excluded, and the steering stability on dry roads can be improved.

Most preferably and in this embodiment, the depth of the deep groove section 16 is gradually decreased in its entire region from the main groove to the shallow groove section 15. During wet running, such deep groove section 16 leads the water in the outboard middle transverse groove 10 toward the main groove, and thereby can improve the wet performance.

Figure 4:
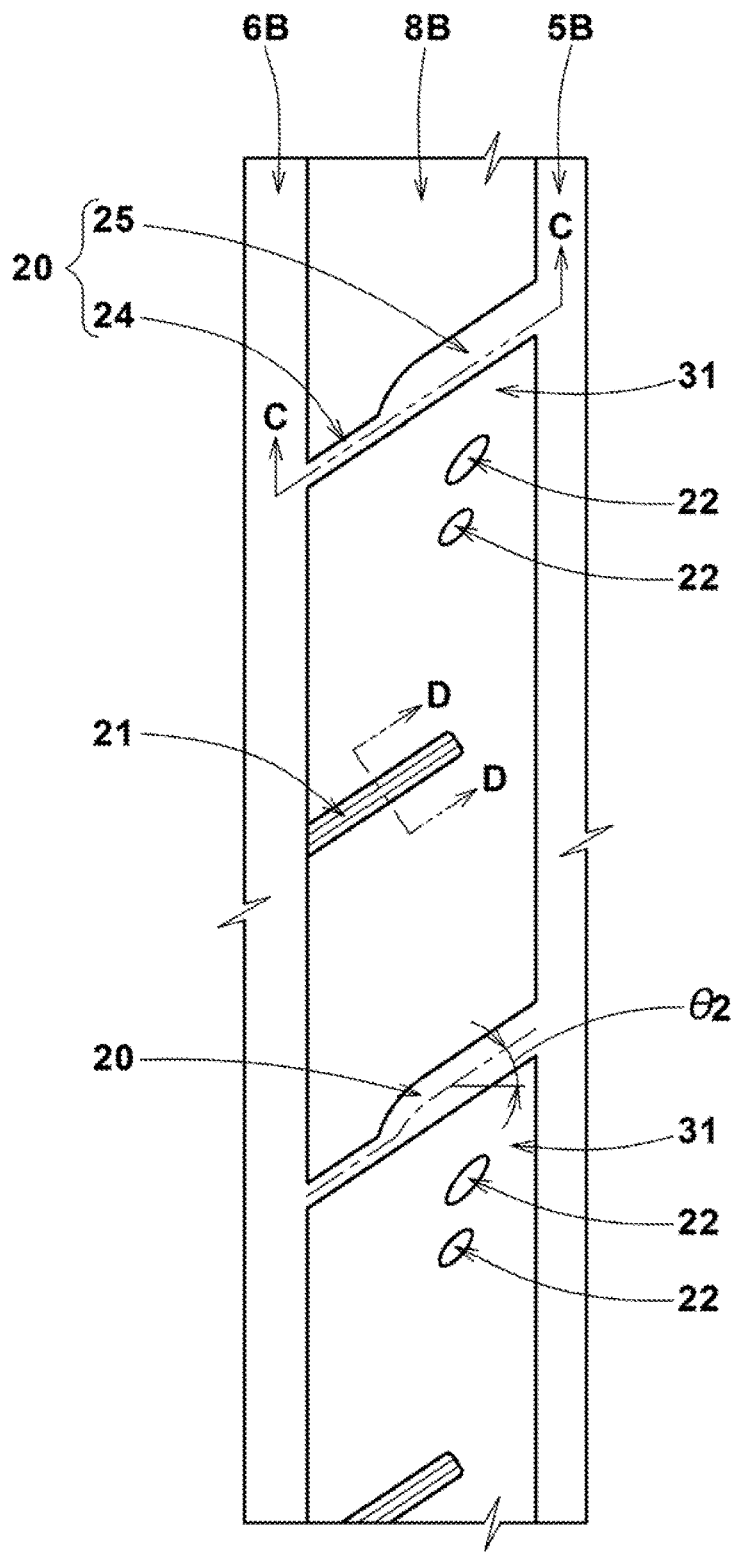
FIG. 4 is a partial top view of the inboard middle land region of the tread portion shown in FIG. 1.

The inboard middle land region 8B, which is defined between the inboard shoulder main groove 5B and the inboard crown main groove 6B, is provided with inboard middle transverse grooves 20, inboard middle sipes 21, and dimples 22 as shown in FIG. 4.

The inboard middle transverse grooves 20 extend from the inboard shoulder main groove 5B to the inboard crown main groove 6B, in this example, while inclining with respect to the tire axial direction oppositely to the inclining direction of the outboard middle transverse grooves 10.

The angle $\theta 2$ of the inboard middle transverse grooves 20 with respect to the tire axial direction is, for example, set in a range of from 30 to 40 degrees.

Such inboard middle transverse grooves 20 can exert friction in the tire circumferential direction and tire axial direction with a good balance by their edges.

As shown in FIG. 4, the inboard middle transverse groove 20 includes an axially inner section 24 and an axially outer section 25. The axially inner section 24 is connected to the inboard crown main groove 6B. The axially outer section 25 is connected to the inboard shoulder main groove 5B.

The axially outer section 25 has a groove width more than that of the axially inner section 24.

The inboard middle transverse groove 20 provided with such axially inner section 24 and the axially outer section 25 helps to improve the wet performance and the steering stability on dry roads with a good balance.

Figure 5A:
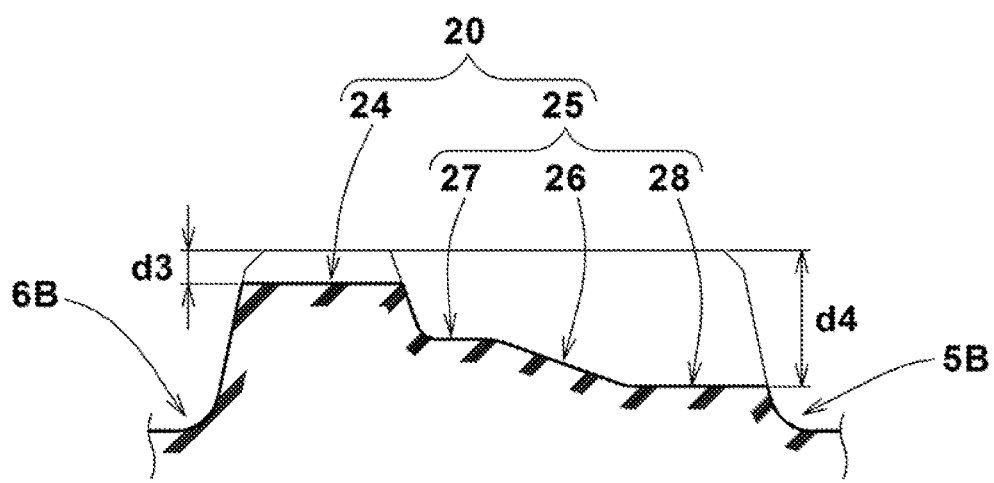
FIG. 5(a) is a cross sectional view taken along line C-C in FIG. 4 showing the depth of an inboard middle transverse groove.

As shown in FIG. 5(a), the depth d3 of the axially inner section 24 is set in a range of from 1.0 to 2.0 mm for example. Preferably, the axially inner section 24 is provided with a part having a constant depth.

More preferably, the axially inner section 24 has a constant depth along its entire length.

Such axially inner section 24 helps to prevent wear of the inboard middle land region 8B in its axial inner part.

The maximum depth d4 of the axially outer section 25 is, for example, set in a range of from 5.5 to 6.5 mm.

Preferably, the axially outer section 25 includes a gradually decreasing part 26 whose depth is gradually decreased toward the axially inner section 24.

More preferably and in this embodiment, the axially outer section 25 has an axially inner first part 27 having a constant depth, and an axially outer second part 28 having a constant depth more than that of the first part 27, and the gradually decreasing part 26 is formed therebetween.

During wet running, such axially outer section 25 leads the water in the inboard middle transverse grooves 20 toward the inboard shoulder main groove 5B.

As shown in FIG. 4, each inboard middle sipe 21 is disposed between the circumferentially adjacent inboard middle transverse grooves 20.

In this specification, the sipe means a narrow groove or a cut whose major part has a groove width of not more than 1.5 mm. Thus, the sipe may have a minor part whose width is more than 1.5 mm.

The inboard middle sipes 21 extend axially outwardly from the inboard crown main groove 6B and terminate within the inboard middle land region 8B.

Preferably, the inboard middle sipes 21 terminate axially outside the axially outer ends of the axially inner sections 24 of the inboard middle transverse grooves 20.
Such inboard middle sipes 21 can be prevented the uneven wear of the inboard middle land region 8B in cooperation with the inboard middle transverse grooves 20.

In this example, the inboard middle sipes 21 are inclined with respect to the tire axial direction to the same direction as the inboard middle transverse grooves 20.
Preferably, the inboard middle sipes 21 in this embodiment extend parallel with the inboard middle transverse grooves 20.

Figure 5B:
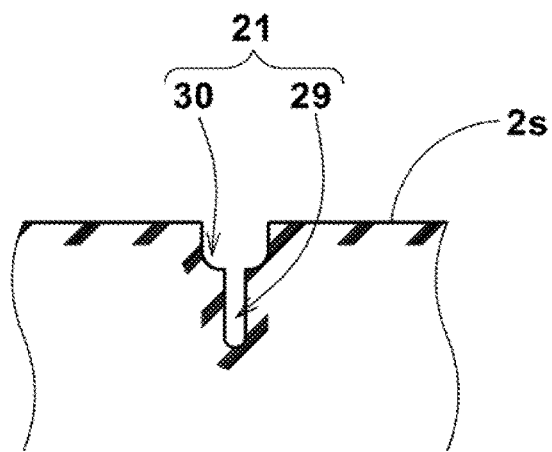
FIG. 5(b) is a cross sectional view of an inboard middle sipe taken along line D-D in FIG. 4.

As shown in FIG. 5(*b*), in the depth direction, the inboard middle sipe 21 includes a radially inner main portion 29 having a constant width, and a radially outer opening portion 30 whose width is increased from the main portion 29 to the tread 2*s*. Such inboard middle sipes 21 can improve wet performance in initial stage of the tire life.

As shown in FIG. 4, the dimple 22 has an opening of an elliptical shape at the tread 2*s*.
Preferably and in this embodiment, the dimples 22 are formed in the vicinity of each acute angled corner 31 between the inboard shoulder main groove 5B and the inboard middle transverse groove 20 in order to improve uneven wear.

Figure 6:
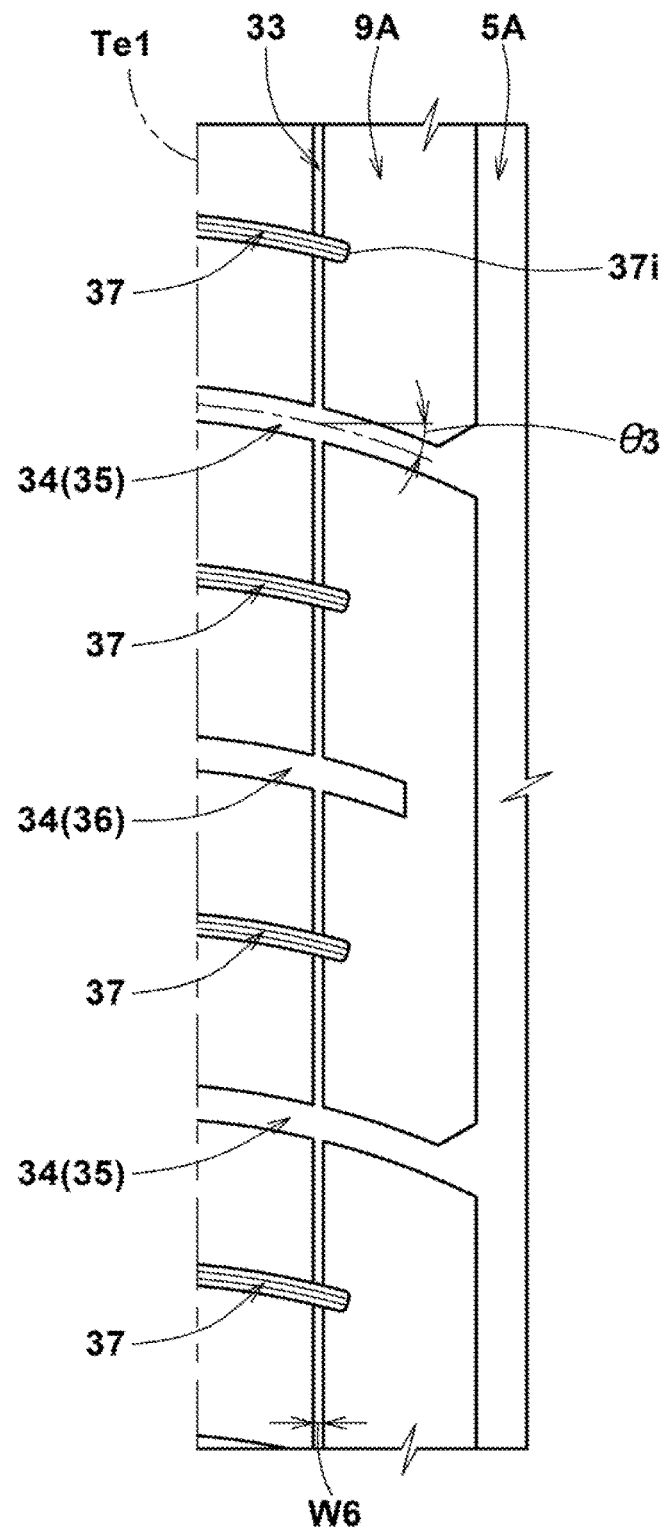
FIG. 6 is a partial top view of an outboard shoulder land region of the tread portion shown in FIG. 1.

The outboard shoulder land region 9A, which is defined on the axially outside of the outboard shoulder main groove 5A, is, as shown in FIG. 6, provided with an outboard shoulder narrow groove 33, outboard shoulder transverse grooves 34, and outboard shoulder sipes 37.

The outboard shoulder narrow groove 33 extends continuously in the tire circumferential direction, and it is a straight groove in this embodiment.
The groove width W6 of the outboard shoulder narrow groove 33 is, for example, set in a range of from 1.0 to 2.0 mm.
The depth of the outboard shoulder narrow groove 33 is, for example, set in a range of from 1.0 to 4.0 mm.

The outboard shoulder transverse grooves 34 extend axially inwardly from at least the outboard tread edge Te1. Preferably and in this embodiment, the outboard shoulder transverse grooves 34 extend axially inwardly beyond the outboard shoulder narrow groove 33.
Preferably, the angle θ3 of the outboard shoulder transverse groove 34 with respect to the tire axial direction is gradually increased toward the axially inside. During wet running, such outboard shoulder transverse groove 34 helps to lead the water in the groove toward the outside of the tire.

The outboard shoulder transverse grooves 34 include first outboard shoulder transverse grooves 35 and second outboard shoulder transverse grooves 36.
The first outboard shoulder transverse grooves 35 and the second outboard shoulder transverse grooves 36 are arranged alternately in the tire circumferential direction.

The axially inner ends of the first outboard shoulder transverse grooves 35 are connected to the outboard shoulder main groove 5A. The axially inner ends of the second outboard shoulder transverse grooves 36 are positioned axially inside the outboard shoulder narrow groove 33 within the outboard shoulder land region 9A. Such first outboard shoulder transverse grooves 35 and the second outboard shoulder transverse grooves 36 can provide good drainage performance while maintaining the rigidity of the outboard shoulder land region 9A.

More preferably, as shown in FIG. 1, the first outboard shoulder transverse grooves 35 are aligned with the deep groove sections 16 of the first outboard middle transverse grooves 11 as if they are smoothly continued through the outboard shoulder main groove 5A.

Similarly, the second outboard shoulder transverse grooves 36 are aligned with the second outboard middle transverse grooves 12 so that the axially inner ends of the second outboard shoulder transverse grooves 36 are positioned on lines axially outwardly extended from the second outboard middle transverse grooves 12.

During wet running, such first outboard shoulder transverse grooves 35 and second outboard shoulder transverse grooves 36 lead water toward the outboard tread edge Te1 in cooperation with the outboard middle transverse grooves 10, and the wet performance can be improved.

As shown in FIG. 6, each outboard shoulder sipe 37 is disposed between the circumferentially adjacent outboard shoulder transverse grooves 34.
The outboard shoulder sipes 37 extend axially inwardly from at least the outboard tread edge Te1 and terminate within the outboard shoulder land region 9A.
Preferably and in this embodiment, the axially inner ends 37*i* of the outboard shoulder sipes 37 are positioned axially inside the outboard shoulder narrow groove 33.
Such outboard shoulder sipes 37 can improve the wet performance and wandering performance with a good balance.

Figure 7:
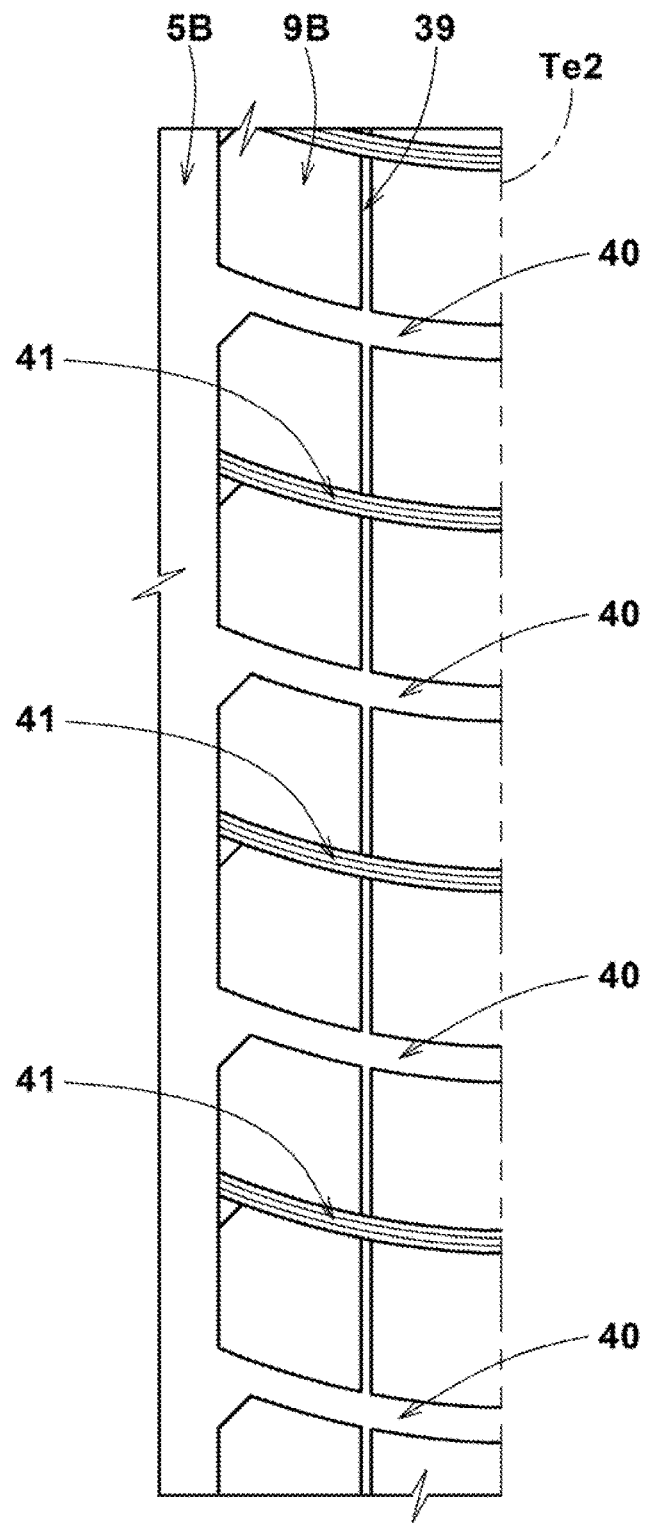
FIG. 7 is a partial top view of an inboard shoulder land region of the tread portion shown in FIG. 1.

The inboard shoulder land region 9B, which is defined on the axially outside of the inboard shoulder main groove 5B, is, as shown in FIG. 7, provided with an inboard shoulder narrow groove 39, inboard shoulder transverse grooves 40, and inboard shoulder sipes 41.

The inboard shoulder narrow groove 39 is constructed similarly to the outboard shoulder narrow groove 33 and extends continuously in the tire circumferential direction.

The inboard shoulder transverse grooves 40 extend axially inwardly from at least the inboard tread edge Te2. The tire axially inner ends of the inboard shoulder transverse grooves 40 are connected to the inboard shoulder main groove 5B.

Each inboard shoulder sipe 41 is disposed between the circumferentially adjacent inboard shoulder transverse grooves 40. The inboard shoulder sipes 41 extend along the inboard shoulder transverse grooves 40. The inboard shoulder sipes 41 extend axially inwardly from at least the inboard tread edge Te2 and are connected to the inboard shoulder main groove 5B. Such inboard shoulder sipes 41 help to further improve the wet performance.

Figure 8:
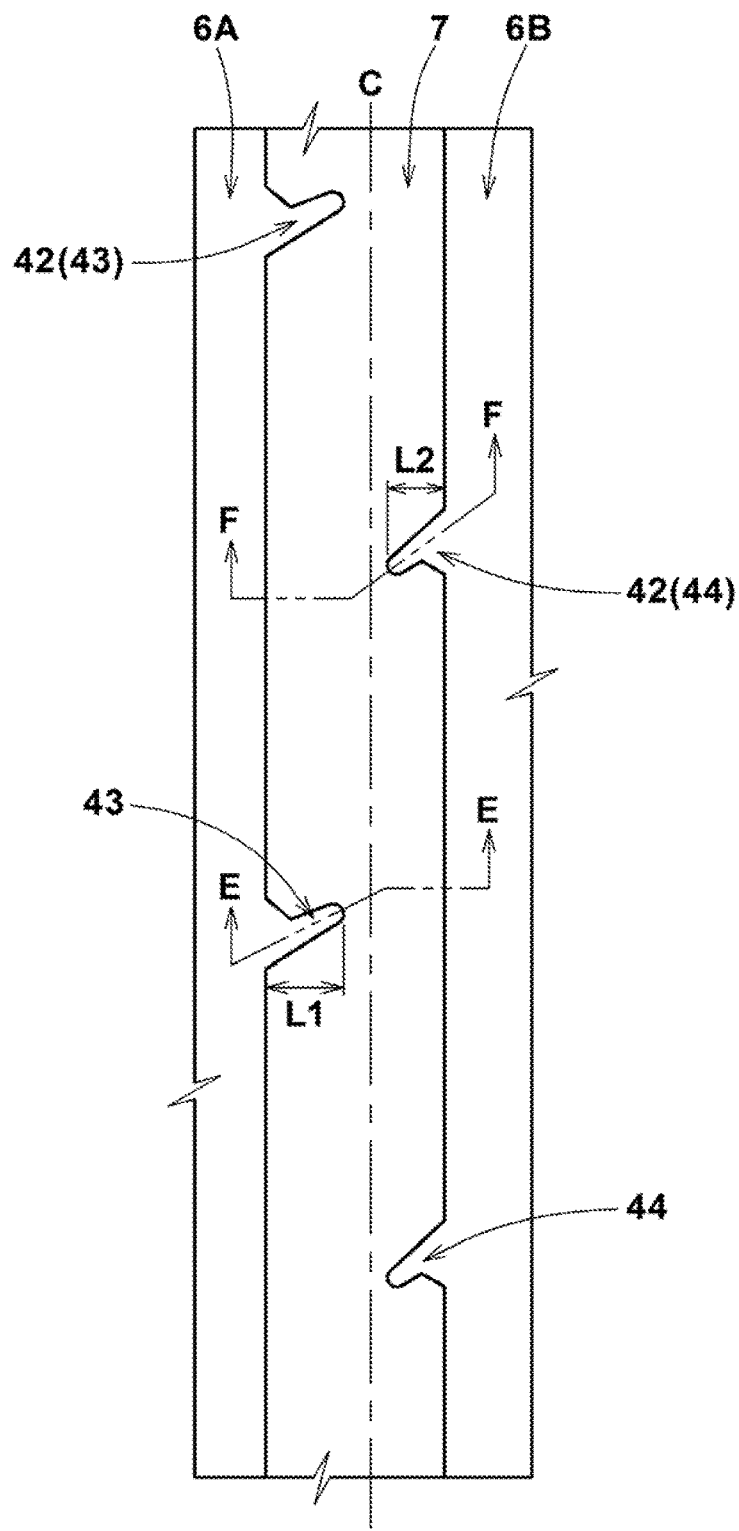
FIG. 8 is a partial top view of a center land region of the tread portion shown in FIG. 1.

The center land region 7, which is defined between the outboard crown main groove 6A and the inboard crown main groove 6B, is a rib extending continuously in the tire circumferential direction as shown in FIG. 8.

The center land region 7 is provided with center grooves 42 each extending from one of the crown main grooves 6A and 6B and terminating within the center land region 7.

The center grooves 42 include first center grooves 43 and second center grooves 44.
The first center groove 43 extends axially inwardly from the outboard crown main groove 6A and terminates without reaching the tire equator C.
The second center groove 44 extends axially inwardly from the inboard crown main groove 6B and terminates without reaching the tire equator C.

The first center grooves 43 and the second center grooves 44 are arranged alternately in the tire circumferential direction.
Preferably, the axial length L2 of the second center grooves 44 is less than the axial length L1 of the first center grooves 43. Such first center grooves 43 and second center grooves 44 help to improve the wet performance while maintaining the rigidity of the center land region 7.

Figure 9A:
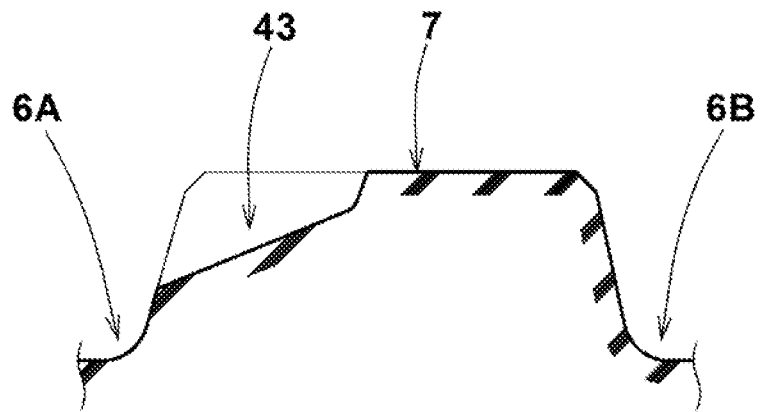
FIG. 9(a) is a cross sectional view of a first center groove taken along line E-E in FIG. 8.
Figure 9B:
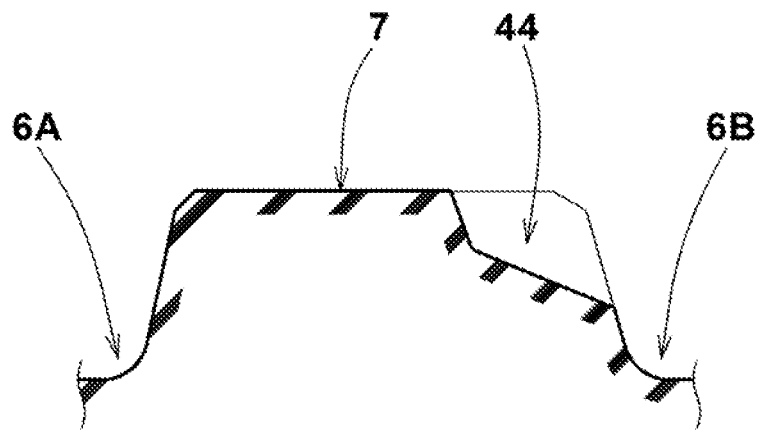
FIG. 9(b) is a cross sectional view of a second center groove taken along line F-F in FIG. 8.

It is preferable that, as shown in FIGS. 9(a) and 9(b), the depth of each center groove 43, 44 is gradually decreased toward the tire equator C.
During wet running, such center grooves 43, 44 lead water toward the crown main grooves, and the wet performance is improved.

While detailed description has been made of an especially preferable embodiment of the present invention, the present invention can be embodied in various forms without being limited to the illustrated embodiment
Comparison Tests Based on the tread pattern shown in FIG. 1, pneumatic tires of size 205/55R16 (rim size 16×6.5 J) having specifications listed in Table 1 were experimentally manufactured and tested for the wet performance and steering stability on dry roads.
In comparative example tire Ref.1, all of the outboard middle transverse grooves were the first outboard middle transverse grooves. In comparative example tire Ref.2, all of the outboard middle transverse grooves were the second outboard middle transverse grooves.

The test tires inflated to 220 kPa were installed on the four wheels of a test car (2000 cc front wheel drive passenger car) and the following tests were carried out.
<Wet Performance>

The test car was run along a 100 meter radius circle on an asphalt road partially provided with a 6 mm depth 6 m long water pool, and the lateral acceleration (lateral G) during running in the water pool was measured at the front wheels, gradually increasing the speed entering into the water pool, to obtain the average for the speed range of from 55 to 80 km/h. The results are indicated in Table 1 by an index based on Comparative example tire Ref.1 being 100, wherein the larger is better.
<Steering Stability on Dry Road>

The test car was run on a dry asphalt road in a test circuit course, and the test driver evaluated the steering stability. The results are indicated by an index based on comparative example tire Ref.1 being 100, wherein the larger the index number, the better the steering stability.

From the test results, it was confirmed that the pneumatic tires according to the present invention can be improved in the steering stability on dry roads while maintaining the wet performance.

REFERENCE SIGNS LIST 2 tread portion
5A outboard shoulder main groove
5B inboard shoulder main groove
6A outboard crown main groove
6B inboard crown main groove
8A outboard middle land region
8B inboard middle land region
10 outboard middle transverse groove
11 first outboard middle transverse groove
12 second outboard middle transverse groove
15 shallow groove section
16 deep groove section
20 inboard middle transverse groove
Te1 outboard tread edge
Te2 inboard tread edge
The invention claimed is:
1. A pneumatic tire comprising:
a tread portion having an outboard tread edge to be positioned away from the center of a vehicle body and an inboard tread edge to be positioned close to the center of the vehicle body, and provided with main grooves extending continuously in the tire circumferential direction,
the main grooves including an outboard shoulder main groove and an outboard crown main groove which are disposed on the outboard-tread-edge side of a tire equator, and between which an outboard middle land region is defined,
the outboard middle land region provided with outboard middle transverse grooves each comprising a shallow groove section extending across the width of the groove and a deep groove section,
the outboard middle transverse grooves including:
first outboard middle transverse grooves wherein their deep groove sections open directly into the outboard

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|---|
| first outboard middle transverse grooves *1 | PR. | AB. | PR. | PR. | PR. | PR. | PR. | PR. | PR. | PR. | PR. | PR. | PR. | PR. | PR. | PR. | PR. | PR. |
| second outboard middle transverse groove *1 | AB. | PR. | PR. | PR. | PR. | PR. | PR. | PR. | PR. | PR. | PR. | PR. | PR. | PR. | PR. | PR. | PR. | PR. |
| shallow groove section's depth d1 (mm) | 1.5 | 1.5 | 1.5 | 1.0 | 1.3 | 1.7 | 2.0 | 1.5 | 1.5 | 1.5 | 1.5 | 1.5 | 1.5 | 1.5 | 1.5 | 1.5 | 1.0 | 2.0 |
| deep groove section's depth d2 (mm) | 6.1 | 6.1 | 6.1 | 6.1 | 6.1 | 6.1 | 6.1 | 5.0 | 5.5 | 6.5 | 7.0 | 6.1 | 6.1 | 6.1 | 6.1 | 6.1 | 5.0 | 7.0 |
| deep groove section's width W5/ shallow groove section's width W1 | 1.6 | 1.6 | 1.6 | 1.6 | 1.6 | 1.6 | 1.6 | 1.6 | 1.6 | 1.6 | 1.6 | 1.0 | 1.3 | 2.0 | 2.2 | 1.6 | 1.6 | 1.6 |
| gradually decreasing part *1 | PR. | PR. | PR. | PR. | PR. | PR. | PR. | PR. | PR. | PR. | PR. | PR. | PR. | PR. | PR. | AB. | AB. | AB. |
| wet performance | 100 | 100 | 100 | 99 | 100 | 102 | 103 | 98 | 99 | 100 | 102 | 99 | 100 | 101 | 102 | 100 | 99 | 103 |
| steering stability | 100 | 100 | 112 | 112 | 112 | 110 | 108 | 113 | 112 | 111 | 108 | 112 | 112 | 111 | 110 | 109 | 110 | 108 |

*1) PR.: presence, AB.: absence shoulder main groove and their shallow groove sections open directly into the outboard crown main groove, and second outboard middle transverse grooves wherein their deep groove sections open directly into the outboard crown main groove and their shallow groove sections are disposed on the outboard shoulder main groove side, and the first outboard middle transverse grooves and the second outboard middle transverse grooves are arranged alternately in the tire circumferential direction, wherein:

the main grooves further include an inboard shoulder main groove and an inboard crown main groove which are disposed on the inboard-tread-edge side of the tire equator, and between which an inboard middle land region is defined, and all grooves disposed in the inboard middle land region and extending across the entire width of the inboard middle land region are third middle transverse grooves each having a deep groove section disposed on the inboard shoulder main groove side and a shallow groove section disposed on the inboard crown main groove side, whereby the tread portion is provided with an asymmetric tread pattern.

2. The pneumatic tire according to claim 1, wherein the deep groove section and the shallow groove section of each of the outboard middle transverse grooves are connected to each other in an axial center part of the outboard middle land region.

3. The pneumatic tire according to claim 1, wherein in each of the outboard middle transverse grooves, the deep groove section has a groove width more than that of the shallow groove section.

4. The pneumatic tire according to claim 1, wherein in each of the outboard middle transverse grooves, the shallow groove section has a constant depth, and the deep groove section has a part whose depth gradually decreases toward the shallow groove section.

5. The pneumatic tire according to claim 1, wherein the tread portion has an outboard shoulder land region which is defined on the axially outside of the outboard shoulder main groove and provided with outboard shoulder transverse grooves extending axially inwardly from the outboard tread edge, the outboard shoulder transverse grooves include first outboard shoulder transverse grooves whose axially inner ends are connected to the outboard shoulder main groove, the first outboard shoulder transverse grooves are aligned with the deep groove sections of the first outboard middle transverse grooves so as to be smoothly continuous therewith through the outboard shoulder main groove.

6. The pneumatic tire according to claim 5, wherein the outboard shoulder transverse grooves include second outboard shoulder transverse grooves terminating within the outboard shoulder land region, and each of the second outboard shoulder transverse grooves is arranged between the circumferentially adjacent the first outboard shoulder transverse grooves.

7. A pneumatic tire, comprising:

a tread portion having an outboard tread edge to be positioned away from the center of a vehicle body and an inboard tread edge to be positioned close to the center of the vehicle body, and provided with main grooves extending continuously in the tire circumferential direction, the main grooves including an outboard shoulder main groove and an outboard crown main groove between which an outboard middle land region is defined, the outboard middle land region provided with outboard middle transverse grooves each comprising a shallow groove section and a deep groove section, the outboard middle transverse grooves including:

first outboard middle transverse grooves wherein their deep groove sections are disposed on the outboard shoulder main groove side and their shallow groove sections are disposed on the outboard crown main groove side, and second outboard middle transverse grooves wherein their deep groove sections are disposed on the outboard crown main groove side and their shallow groove sections are disposed on the outboard shoulder main groove side, and the first outboard middle transverse grooves and the second outboard middle transverse grooves arranged alternately in the tire circumferential direction, wherein the tread portion comprises an outboard shoulder land region which is defined on the axially outside of the outboard shoulder main groove and provided with outboard shoulder transverse grooves extending axially inwardly from the outboard tread edge, wherein the outboard shoulder transverse grooves include:

first outboard shoulder transverse grooves whose axially inner ends are connected to the outboard shoulder main groove; and second outboard shoulder transverse grooves terminating within the outboard shoulder land region, wherein the first outboard shoulder transverse grooves are aligned with the deep groove sections of the first outboard middle transverse grooves so as to be smoothly continuous therewith through the outboard shoulder main groove, and wherein the second outboard shoulder transverse grooves are aligned with the second outboard middle transverse grooves so that the axially inner ends of the second outboard shoulder transverse grooves are substantially positioned at axially outward extensions of the second outboard middle transverse grooves.

8. The pneumatic tire according to claim 2, wherein in each of the outboard middle transverse grooves, the deep groove section has a groove width more than that of the shallow groove section.

9. The pneumatic tire according to claim 2, wherein in each of the outboard middle transverse grooves, the shallow groove section has a constant depth, and the deep groove section has a part whose depth gradually decreases toward the shallow groove section.

10. The pneumatic tire according to claim 3, wherein in each of the outboard middle transverse grooves, the shallow groove section has a constant depth, and the deep groove section has a part whose depth gradually decreases toward the shallow groove section.

11. The pneumatic tire according to claim 2, wherein the tread portion has an outboard shoulder land region which is defined on the axially outside of the outboard shoulder main groove and provided with outboard shoulder transverse grooves extending axially inwardly from the outboard tread edge, the outboard shoulder transverse grooves include first outboard shoulder transverse grooves whose axially inner ends are connected to the outboard shoulder main groove, the first outboard shoulder transverse grooves are aligned with the deep groove sections of the first outboard middle transverse grooves so as to be smoothly continuous therewith through the outboard shoulder main groove.

12. The pneumatic tire according to claim 3, wherein the tread portion has an outboard shoulder land region which is defined on the axially outside of the outboard shoulder main groove and provided with outboard shoulder transverse grooves extending axially inwardly from the outboard tread edge, the outboard shoulder transverse grooves include first outboard shoulder transverse grooves whose axially inner ends are connected to the outboard shoulder main groove, the first outboard shoulder transverse grooves are aligned with the deep groove sections of the first outboard middle transverse grooves so as to be smoothly continuous therewith through the outboard shoulder main groove.

13. The pneumatic tire according to claim 4, wherein the tread portion has an outboard shoulder land region which is defined on the axially outside of the outboard shoulder main groove and provided with outboard shoulder transverse grooves extending axially inwardly from the outboard tread edge, the outboard shoulder transverse grooves include first outboard shoulder transverse grooves whose axially inner ends are connected to the outboard shoulder main groove, the first outboard shoulder transverse grooves are aligned with the deep groove sections of the first outboard middle transverse grooves so as to be smoothly continuous therewith through the outboard shoulder main groove.

* * * * *